United States Patent
Thayaparan et al.

(10) Patent No.: US 12,020,196 B2
(45) Date of Patent: Jun. 25, 2024

(54) OPTIMIZED TREE ENSEMBLE BASED DEMAND MODEL

(71) Applicants: Oracle International Corporation, Redwood Shores, CA (US); MASSACHUSETTS INSTITUTE OF TECHNOLOGY, Cambridge, MA (US)

(72) Inventors: Leann Thayaparan, Manlius, NY (US); Kiran V. Panchamgam, Bedford, MA (US); Setareh Borjian, New Haven, CT (US); Georgia Perakis, Belmont, MA (US)

(73) Assignees: Oracle International Corporation, Redwood Shores, CA (US); MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 282 days.

(21) Appl. No.: 17/449,112

(22) Filed: Sep. 28, 2021

(65) Prior Publication Data

US 2023/0096633 A1    Mar. 30, 2023

(51) Int. Cl.
*G06Q 10/00* (2023.01)
*G06F 18/214* (2023.01)
(Continued)

(52) U.S. Cl.
CPC ....... *G06Q 10/067* (2013.01); *G06F 18/2148* (2023.01); *G06N 20/20* (2019.01); *G06Q 10/08* (2013.01); *G06Q 10/087* (2013.01)

(58) Field of Classification Search
CPC ...... G06N 20/00; G06N 20/20; G06Q 10/063; G06Q 10/067; G06Q 10/08; G06Q 10/087
See application file for complete search history.

(56) References Cited

U.S. PATENT DOCUMENTS

| | | |
|---|---|---|
| 10,528,903 B2 | 1/2020 | Kannan et al. |
| 10,776,803 B2 | 9/2020 | Kannan et al. |
| 2018/0336487 A1* | 11/2018 | Moore ............. G06N 20/20 |

FOREIGN PATENT DOCUMENTS

| | | | |
|---|---|---|---|
| WO | WO-2019088972 A1 * | 5/2019 | ............. G06N 20/20 |
| WO | 2019125612 A1 | 6/2019 | |

OTHER PUBLICATIONS

McNellis, R. T. (2020). Training decision trees for optimal decision-making (Order No. 27994475). Available from ProQuest Dissertations and Theses Professional. (2407615074). (Year: 2020).*

(Continued)

*Primary Examiner* — William S Brockington, III
(74) *Attorney, Agent, or Firm* — Potomac Law Group, PLLC

(57) ABSTRACT

Embodiments generate an optimized demand model for a retail item. Embodiments train a tree ensemble machine learning model comprising a plurality of trees, the training comprising storing upper bounds for each of the trees, the trees comprising levels and branches that correspond to the demand features that influence demand for the item. Embodiments generate an objective function for the demand model. At a top split of each tree, embodiments determine optimal child nodes using the stored upper bounds and calculate a new feasible region for each tree. Using bounds on the new feasible region, embodiments move down each tree to a next level of splits and generate the optimized demand model when a leaf node of every tree has been reached.

20 Claims, 10 Drawing Sheets

(51) Int. Cl.
*G06N 20/20* (2019.01)
*G06Q 10/067* (2023.01)
*G06Q 10/08* (2023.01)
*G06Q 10/087* (2023.01)

(56) References Cited

OTHER PUBLICATIONS

Velibor V. Misic, "Optimization of Tree Ensembles", arxiv. org, Cornell University Library, 201 Olin Library Cornell University Ithaca, NY 14853, May 31, 2017, XP081496288, the whole document.

* cited by examiner

OPTIMIZED TREE ENSEMBLE BASED DEMAND MODEL

One embodiment is directed generally to a computer system, and in particular to a computer system that forecasts demand.

BACKGROUND INFORMATION

Products are typically delivered to consumers through a network of manufacturers, distributors, transporters, retailers, etc. Such a network of facilities that together deliver products to consumers is commonly referred to as a "supply chain" network.

Suppliers of products (e.g., manufactures, vendors, retailers, etc.) often face the task of forecasting the demand for the products/items in order to provide a smooth and efficient flow of the products through the supply chain network in the presence of constantly-changing market conditions. Overestimating the demand can result in overproduction and increased costs associated with holding inventories (e.g., storage costs, obsolescence, etc.). Underestimating the demand, on the other hand, can result in lost revenues.

Further, in the retail industry, retailers need to predict their demand in the future to better manage their inventory or promotion/markdown planning. Retailers may engage in many types of promotions to boost their sales. To generate an accurate forecast, a retailer has to consider all factors/features which could impact the demand, such as promotions, price, seasonality, weather, etc.

In general, demand forecast systems encounter problems in producing a week-by-week forecast of sales units for retail items. The demand of retail items in a given week is affected by many factors, such as seasonal factors, whether a discount has been applied to a retail item during the week, and at what point in the lifecycle of a merchandise the week falls. One common approach to forecasting weekly demand units involves building a "causal demand model" for retail items. This demand model is a mathematical model that describes weekly demand units in terms of factors such as the ones listed above. The factors are known as the "demand variables" or "demand features" that form a demand model.

The demand model specifies mathematically how the demand variables affect demand units. For example, if the amount of discount is a demand variable, historical data may show that a 50% price cut resulted in a 4-fold increase in sales units (i.e., related to price elasticity). In this example, the demand variable is a 50% price cut and the historical sales data is the 4-fold increase in sales. The historical sales unit is indicative of the demand if there were no stock-out weeks during the historical period. Typically, the historical sales data is pre-processed to correct the censored data, that is, to adjust the sales units for the weeks where inventory was insufficient. In order for the causal demand model to be of use in forecasting demand units, it is necessary to determine the relationship of the demand variable (50% price cut) to the historical sales units (4-fold increase). This relationship is referred to as the "demand parameter" associated with the demand variable.

In this example, the demand parameter may be determined to specify that for every 25% price reduction, demand of a particular retail item will increase by 2-fold. With the demand parameter determined, it is then possible to forecast demand units by specifying the future values of the demand variables. To continue the price cut example, the retailer might know that next season it will be running a 40% price cut during some weeks. The demand model will then forecast demand units for those weeks accounting for the 40% price cut.

The demand parameter is determined by examining historical retail sales data (known as "retail panel data") containing price cuts for the retail item itself, or for similar retail items. However, as noted above, several demand variables affect the sales of retail items. These several demand variables apply simultaneously. For example, a retailer may have performed the 50% price cut during the summer for a summer item, in which case the 4-fold increase in sales may be partially due to an increase in seasonal demand for summer retail items during summer. To separate the effects of the several demand variables on sales, a regression can be performed on the demand model to determine values for demand parameters that cause the demand model to best fit retail panel data.

SUMMARY

Embodiments generate an optimized demand model for a retail item. Embodiments train a tree ensemble machine learning model comprising a plurality of trees, the training comprising storing upper bounds for each of the trees, the trees comprising levels and branches that correspond to the demand features that influence demand for the item. Embodiments generate an objective function for the demand model. At a top split of each tree, embodiments determine optimal child nodes using the stored upper bounds and calculate a new feasible region for each tree. Using bounds on the new feasible region, embodiments move down each tree to a next level of splits and generate the optimized demand model when a leaf node of every tree has been reached.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Figure 1:
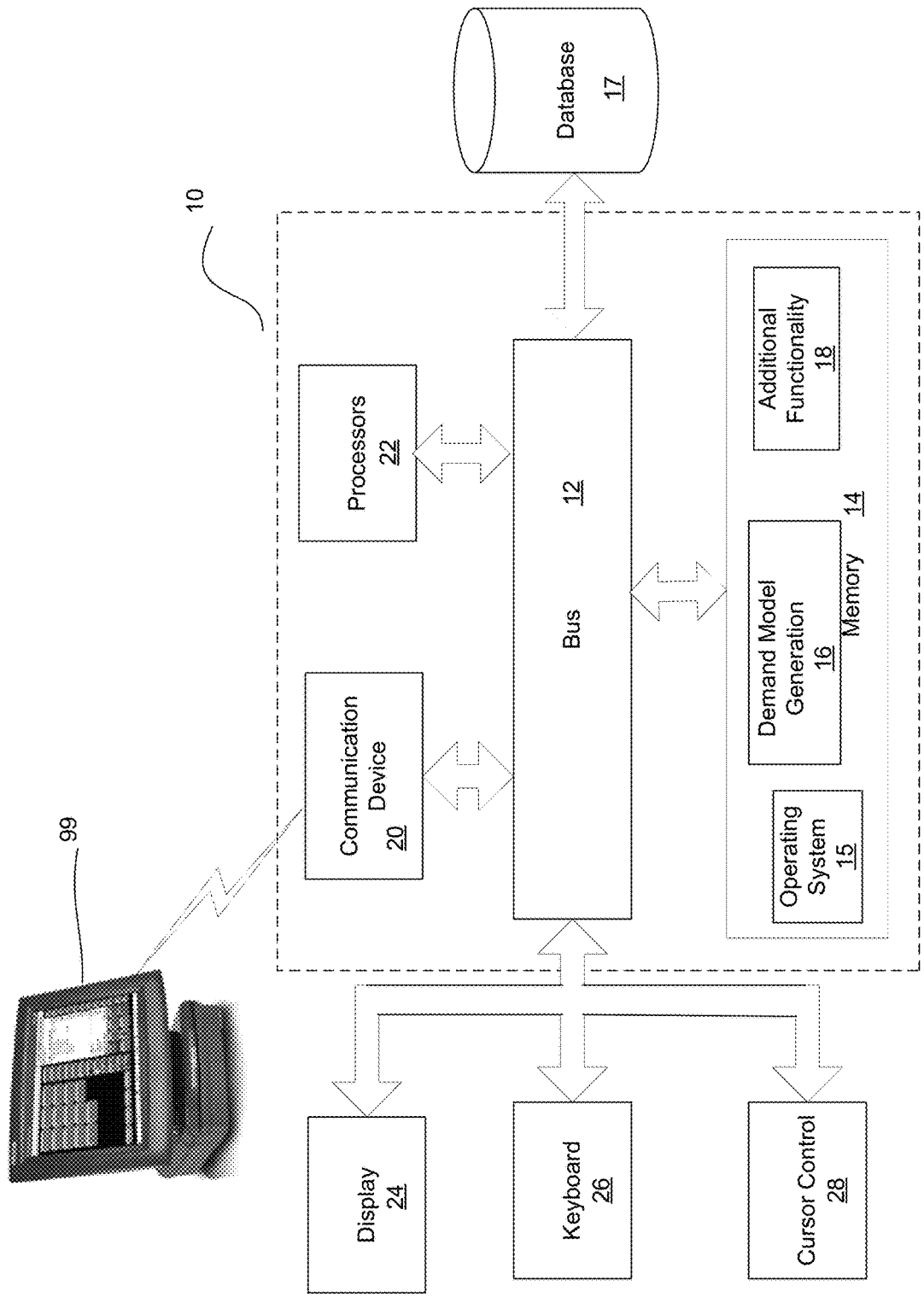
FIG. 1 is a block diagram of a computer server/system in accordance with an embodiment of the present invention.

One embodiment generates a tree ensemble based demand model using features that influence demand for a product. Embodiments optimize the tree ensemble by determining and storing upper bounds while each of the trees are being built. The optimized tree ensemble forms the demand model which can be used to optimize the pricing and inventory of the product.

In order to improve demand forecasting, retailers have begun to move to modern machine learning technologies, such as support vector machine ("SVM"), artificial neural network ("ANN"), random forest, and so on. However, typically a retailer will just pick one model for each category of product and set of locations. As used herein, a retailer can include a single retail store, or can include a large amount of retail stores all integrated and managed by single or multiple logistic operations.

Further, for many machine learning algorithms (SVM, ANN, random forest, etc.), retailers will use a feature set (i.e., various attributes of an item) to define the data point at the product/location/calendar intersection. In these algorithms, retailers will train the model with the same feature set as it does for forecasting. Further, the same feature set could be used by several different algorithms for forecasting. A "feature set" is the collection of features that impact the demand or sales for an item as well as describe attributes of an item. Examples of features include price, seasonality, brand, promotions, size, color, pack size, supplier, length, etc. While features such as price and seasonality may be relevant for all types of products, some others are item specific. For example, pack size impacts the demand for yogurts, however the length of the pack is insignificant. Conversely, the brand is very important for fashion items, but is much less important for hardware items, such as nails or hammers.

Embodiments, in general, utilize the following demand model or function for demand forecasting ("equation (1)"):

$$\text{Demand} = \text{base demand} * \text{seasonality} * \text{promo effects} \\ (* \text{additional features effects}) \quad (1)$$

Where "base demand" is the historical demand without taking into account any effects or other factors, seasonality is the impact on demand based on the season (i.e., time of year), and promo effects are the effects on demand based on one or more promotions offered during a time period. Any or all additional features/variables that impact demand can be added to the model as appropriate. However, the number of features could exceed 100 in some situations.

Specifically, the retail industry has evolved over the past decades so that online sales have become a very important aspect of an online retailer's profitability. This has allowed the retailer to have access to a large amount of data not only on the products and their respective sales but also on the customers buying them. As a result, the retailers like to use this data (e.g., a large number of features in connection with the sales) in order to procure inventory or set prices (e.g., determine promotions and price markdowns) over the coming quarter or season in a more intelligent way that maximizes the retailer's revenues or profits. Two key challenges for retailers is not only how to leverage this data in order to develop accurate, scalable and interpretable methods for demand prediction but also how to integrate these methods into their pricing or inventory optimization problems.

Recent advances in machine learning and availability of the tools have enabled the first stage of the process, namely, the estimation of sophisticated relationships between data and demand (and/or sales) with increasing accuracy by incorporating a large number of features. Features play a dual role as they not only help in predicting demand but also operationalize decision-making. Although having a large set of features might help increase demand forecast accuracy, using a large set of features turns the subsequent optimization problem (for example, deciding pricing) intractable.

In the area of demand prediction, solutions for retailers increasingly use machine learning models such as regression trees, random forests, classification and neural networks over more traditional models such as linear, log-log and log-linear regression. However, utilizing these demand models for a retailer's optimization problems such as promotion and markdown pricing remains difficult. For instance, the machine learning models typically give rise to non-parametric objective functions that are high dimensional and as a result are hard to optimize with the current known optimization tools. Further, as these are high dimensional, constrained decision-making problems using mixed-integer linear programming ("MILP") is often not a computationally tractable problem. In contrast, embodiments provide feasible approximation methods to solve these problems.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display. FIG. 1 can be used to implement any of the components disclosed herein.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a demand model generation module 16 that generates an optimized tree ensemble based demand mode, and all other functionality disclosed herein. System 10 can be part of a larger system. Therefore, system 10 can include one or more additional functional modules 18 to include the additional functionality, such as a retail management system (e.g., the "Oracle Retail Demand Forecasting System" or the "Oracle Retail Science Platform" from Oracle Corp.) or an enterprise resource planning ("ERP") system. The additional functional modules 18 include additional functionality that implements the demand model generated by demand model generation 16, such as functionality that uses the demand model to generate optimized promotion and markdown pricing or inventory optimization. The additional functionality may include the "Oracle Retail Offer Optimization Cloud Service" and the "Oracle Retail Inventory Optimization Cloud Service."

A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 99 generates the transactional data and historical sales data (e.g., data concerning transactions of each item/SKU at each retail store) used to forecast demand. POS terminal 99 itself can include additional processing functionality to generate a demand model in accordance with one embodiment and can operate as a specialized demand model generation system either by itself or in conjunction with other components of FIG. 1.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As discussed, embodiments implement a demand model that incorporates a class of Machine Learning ("ML") models referred to as "tree ensemble." Known approximation optimization algorithms that can be used for regression trees work well for "simple" regression trees but generally fall short when a tree ensemble is used. Optimization problems when the objective function comes from a tree ensemble method, such as, Classification and Regression Trees ("CART") and random forests is a non-trivial problem due to the high dimensional nature of the problem and the associated constraints on what a feasible decision may be from the tree (or forest). Further, a key difficulty comes from the fact that the random forest is combinatorial on its own. Some combinatorial problems (with special structure) can leverage the power of mixed integer linear programming ("MILP").

Embodiments bridge the gap between the above ML methods in the retail industry and developing methods for optimization problems such as pricing and inventory. As these ML functions are not parametric, the problem of how to optimize in a scalable and efficient manner is difficult. In general, known optimization solutions in the retail industry cannot leverage the ML models.

Embodiments implement an upper bound optimization for demand models that implement tree based ML models, including random forest or XGBoost. In forming the demand model for a particular retail product using the ensemble methods, a multitude of trees are built, each being trained on a subset of the data (in this case, a subset of the historical sales). This helps with mitigating the regression trees' tendency of overfitting to their training set. In each individual tree, there are many branches and levels that correspond to different demand features. Optimizing over the tree ensemble is difficult because a powerful prediction model often includes thousands of trees and hundreds of branches in each tree, forming a large tree ensemble. Therefore, embodiments incorporate an upper bound optimization using either a box method (when the tree ensemble machine learning has parallel splits) or a hyperplane method (when the tree ensemble machine learning has hyperplane splits) that are implemented when each tree is being built.

Embodiments first develop the demand model using an ML model such as random forest or XGBoost. A target variable (i.e., the variable that the model is designed to predict) is demand of an item at a location, and week in one embodiment. Features included may be product attributes, price, seasonal data, holiday information, census data, weather, stock price, inventory information, etc. ML models such as random forest or XGBoost are frequently used for retail item prediction models due to their ability to model complex, nonlinear relationship between the features and the dependent variable and because they provide interpretability and higher forecast accuracy over traditionally used models.

In general, known optimization algorithms are run sequentially, after the demand model is developed. However, these known approaches do not work with non-parametric ML models, such as random forest or XGBoost, because it takes an exponential amount of time to generate all possible solutions to figure out the most optimal solution. For example, consider a binary decision tree with 3 features that predicts the demand of the item. At every node, there is a decision to make (e.g., whether the item has a discount) with two possible outcomes: Yes and No. Once that node in the tree is traversed down, at the next node there is another decision (e.g., is the item on special display) to make with two outcomes. This continues until the bottom of the tree is reached, referred as the "leaf nodes" of the tree. In the example with 3 features, there are 8 leaf nodes. To generalize, for a binary tree with n features, there are at most $2^n$ leaf nodes. In a tree ensemble, there are several trees (e.g., m trees) that are used together to make a prediction. As the number of leaf nodes grows exponentially, it is practically impossible to predict what would be the impact of a pricing decision by traversing all the trees to evaluate the pay off.

In contrast with known solutions that attempt to optimize after the demand model is developed, embodiments leverage the tree building/training process and store upper bounds while the tree is being built/trained for prediction purposes. Embodiments optimize by finding the optimal region for the set of variables that would maximize/minimize either the ensemble trees' prediction, or a function based on the prediction.

Embodiments can incorporate business constraints and scales well compared to other convex optimization formulations (e.g., Quadratic Program, Binary Program and Lagrangean Relaxation). Embodiments leverage the building process (i.e., the training) of a tree to store information about what the best payoff could be on either side of a tree split, referred to as the "upper bound" optimization. This information is created and stored based on the data of the split, without having to explore the entire depth of the tree and is used to quickly optimize in an iterative 3-step algorithm.

Figure 2:
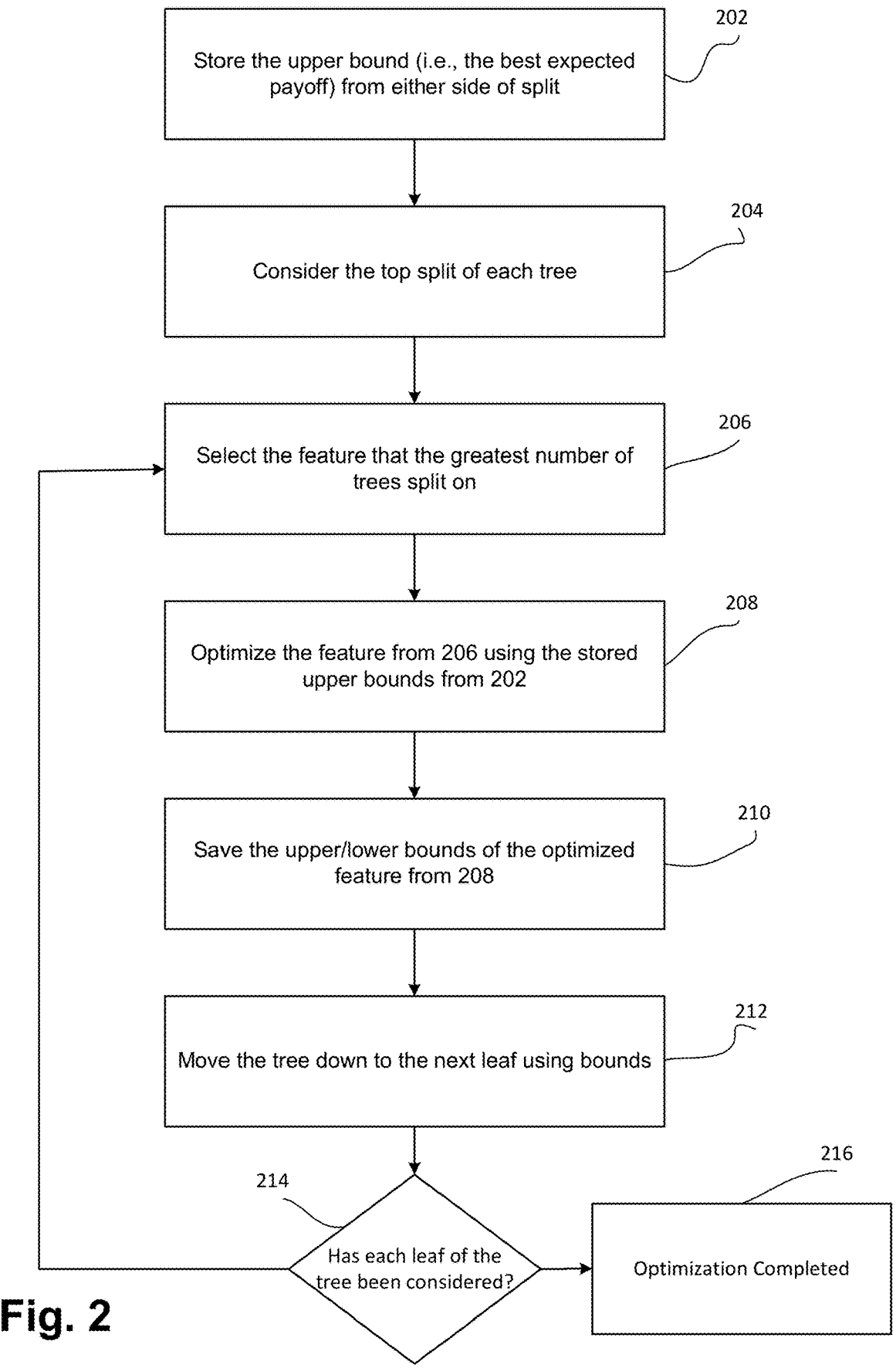
FIG. 2 is a flow diagram of the functionality of the demand model generation of FIG. 1 when generating an optimized tree ensemble for a demand model in accordance with one embodiment.

FIG. 2 is a flow diagram of the functionality of demand model generation 16 of FIG. 1 when generating an optimized tree ensemble for a demand model in accordance with one embodiment. In one embodiment, the functionality of the flow diagram of FIG. 2 (and FIGS. 5 and 9 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The functionality of FIG. 2 is an upper bound optimization using a box method when the tree ensemble machine learning has parallel splits. The functionality of FIG. 2 applies when optimizing an objective function, such as a demand model using the price or inventory level for a retail product. The functionality of FIG. 2 generates a demand prediction model and optimizes (for example the price or the inventory) over that model (i.e., optimize the price/inventory with the assumption that the demand units will be given by the predictions of the generated model).

At 202, when building/training each tree, the upper bound (i.e., the best expected payoff) is stored from either side of split.

At 204, the top split of each tree is considered.

At 206, the feature that the greatest number of trees split on is selected.

At 208, the feature from 206 is optimized using the stored upper bounds from 202. This is done by subsetting the feasible region of the feature based on what would be considered optimal by the upper bounds and the tree split criterion.

At 210, the upper/lower bounds of the optimized feature from 208 is saved.

At 212, the tree is moved down to the next leaf using bounds.

At 214, it is determined if a leaf of every tree has been reached. If yes, at 216 the optimization is complete. If no, the functionality for the next node continues at 206.

Figure 3:
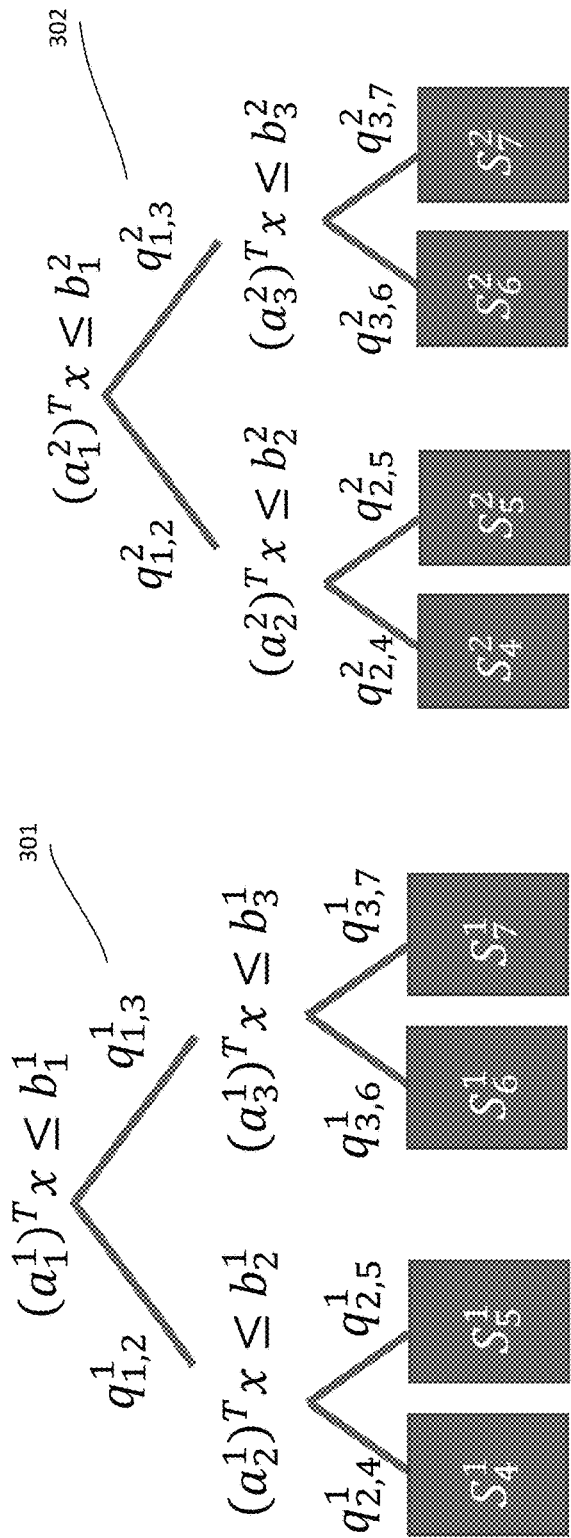
FIG. 3 illustrates three example trees and corresponding notation to further explain the functionality of FIG. 2 in accordance to embodiments.
Figure 3:
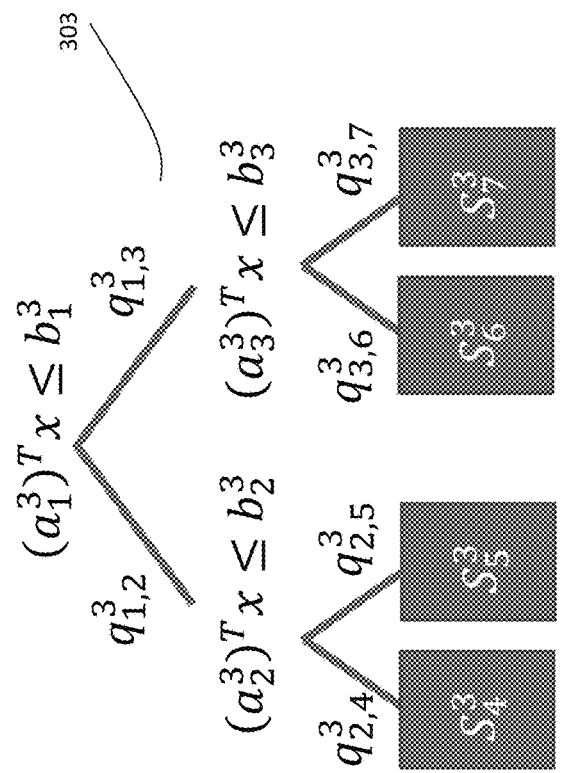
Figure 4:
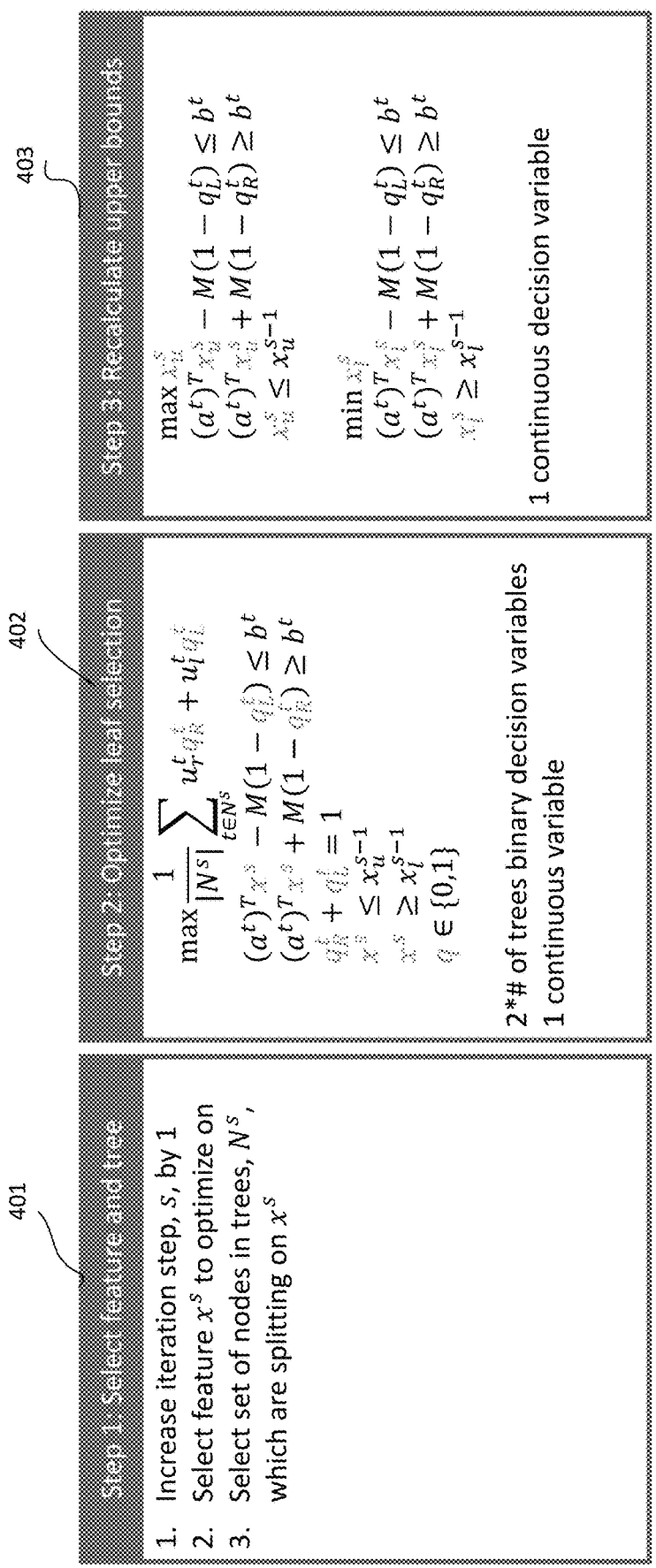
FIG. 4 illustrates the functionality of FIG. 2 in terms of the notation of FIG. 3.

FIG. 3 illustrates three example trees 301-303 and corresponding notation to further explain the functionality of FIG. 2 in accordance to embodiments. The notations of FIG. 3 are as follows:

$(a_i^t)^T x \leq b_i^t$ is the split decision at node i in tree t $S_i^t$ is the payoff at leaf node i in tree t $q_{i,L_i}^t, q_{i,R_i}^t$ is the binary decision to go to node i's left or right child $L^t$ is the set of leaf nodes FIG. 4 illustrates the functionality of FIG. 2 in terms of the notation of FIG. 3. 401 corresponds to 206 of FIG. 2. 402 corresponds to 208 of FIG. 2. 403 corresponds to 210 of FIG. 2.

Figure 5:
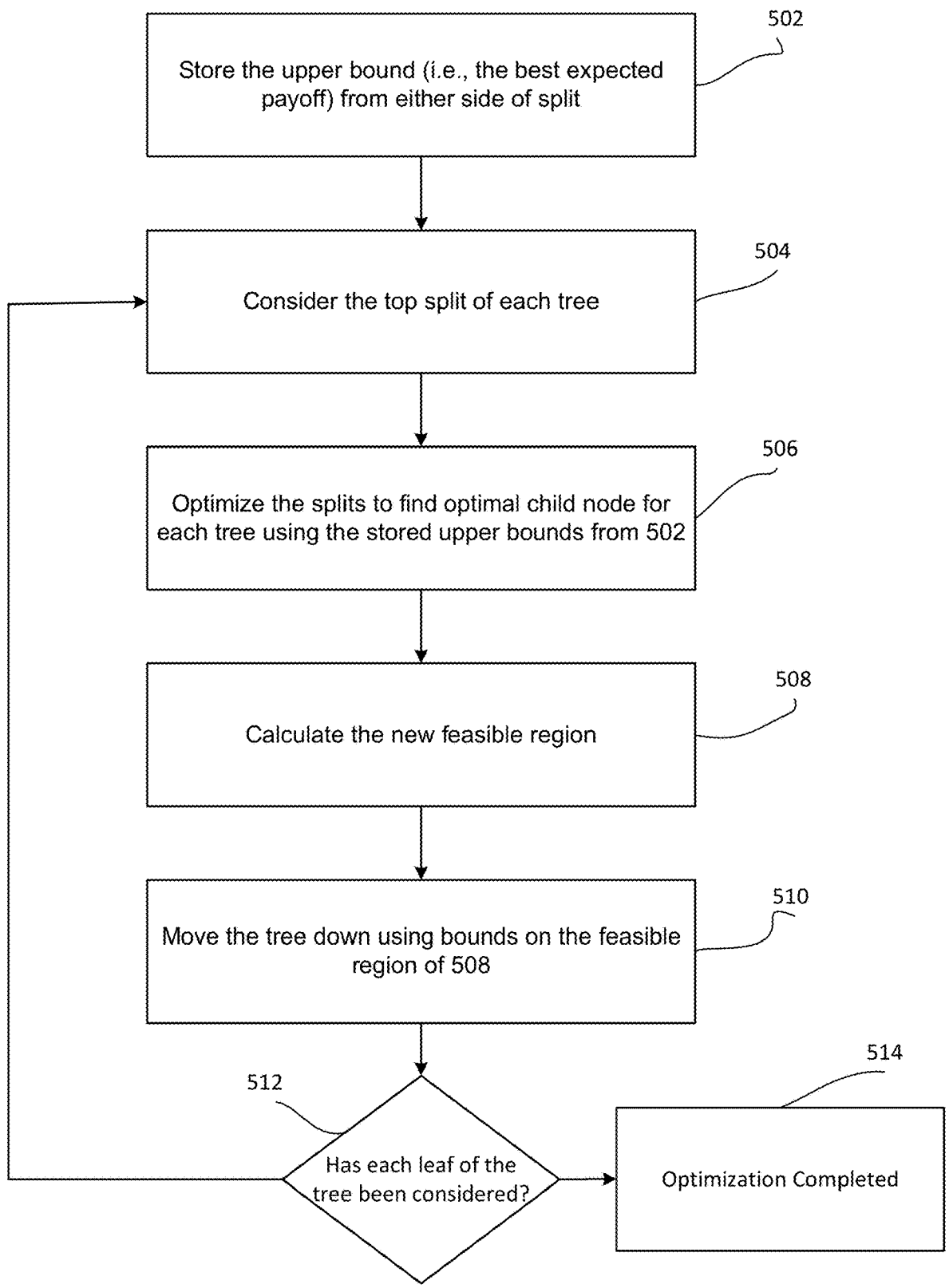
FIG. 5 is a flow diagram of the functionality of the demand model generation of FIG. 1 when generating an optimized tree ensemble for a demand model in accordance with one embodiment.

FIG. 5 is a flow diagram of the functionality of demand model generation 16 of FIG. 1 when generating an optimized tree ensemble for a demand model in accordance with one embodiment. The functionality of FIG. 5 is an upper bound optimization using a hyperplane method when the tree ensemble machine learning has hyperplane splits. The functionality of FIG. 5 applies when optimizing an objective function, such as a demand model for a retail product.

At 502, when building/training each tree, the upper bound (i.e., the best expected payoff) is stored from either side of split.

At 504, the top split of each tree is considered.

At 506, the splits are optimized to find optimal child node for each tree using the stored upper bounds from 502.

At 508, the new feasible region is calculated based on the optimal region determined by the child nodes of each tree and an ellipsoid approximation.

At 510, the tree is moved down using bounds on the feasible region of 508.

At 512, it is determined if each leaf of the tree has been considered. If yes, at 514 the optimization is complete. If no, the functionality for the next leaf continues at 506.

Figure 6:
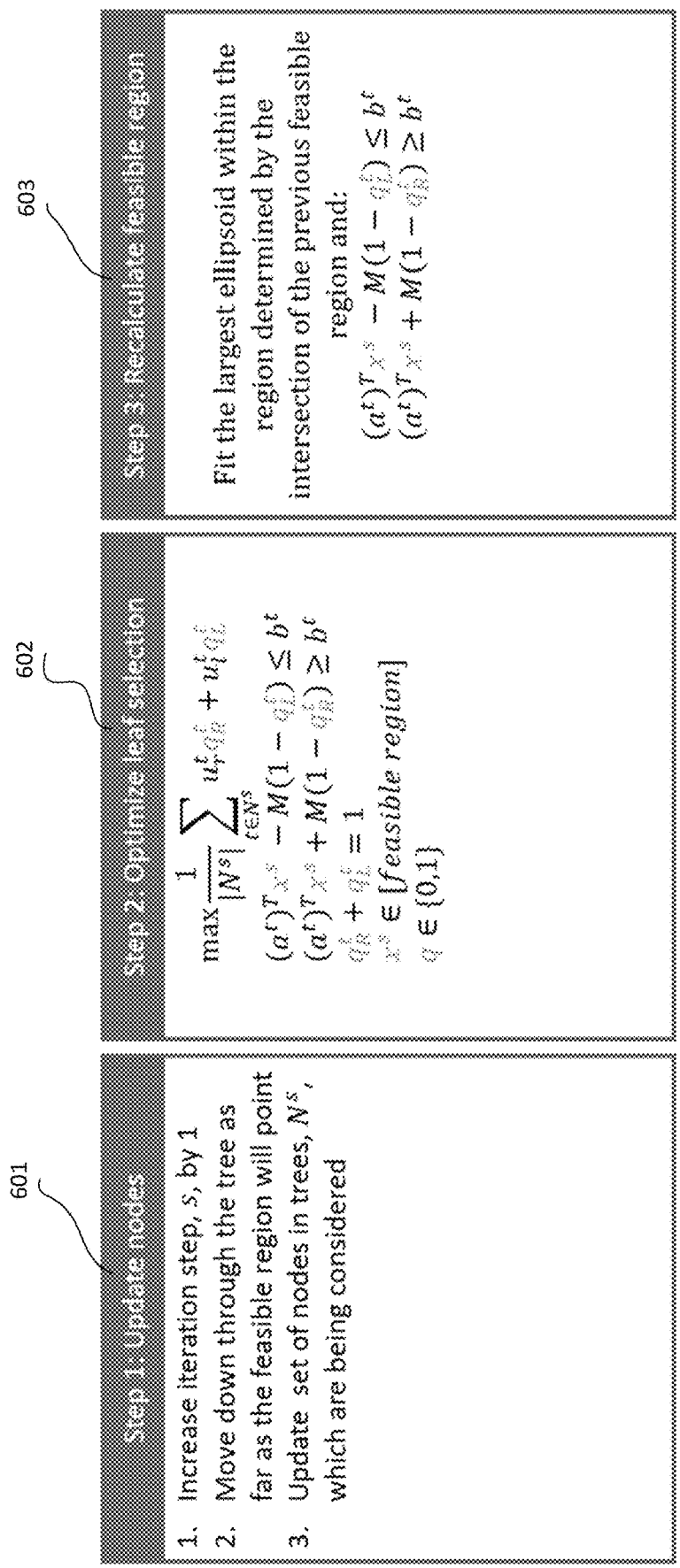
FIG. 6 illustrates the functionality of FIG. 5 in terms of the notation of FIG. 3.

FIG. 6 illustrates the functionality of FIG. 5 in terms of the notation of FIG. 3. 601 corresponds to 504, 510 and 512 of FIG. 5. 602 corresponds to 506 of FIG. 5. 603 corresponds to 508 of FIG. 5.

Figure 7:
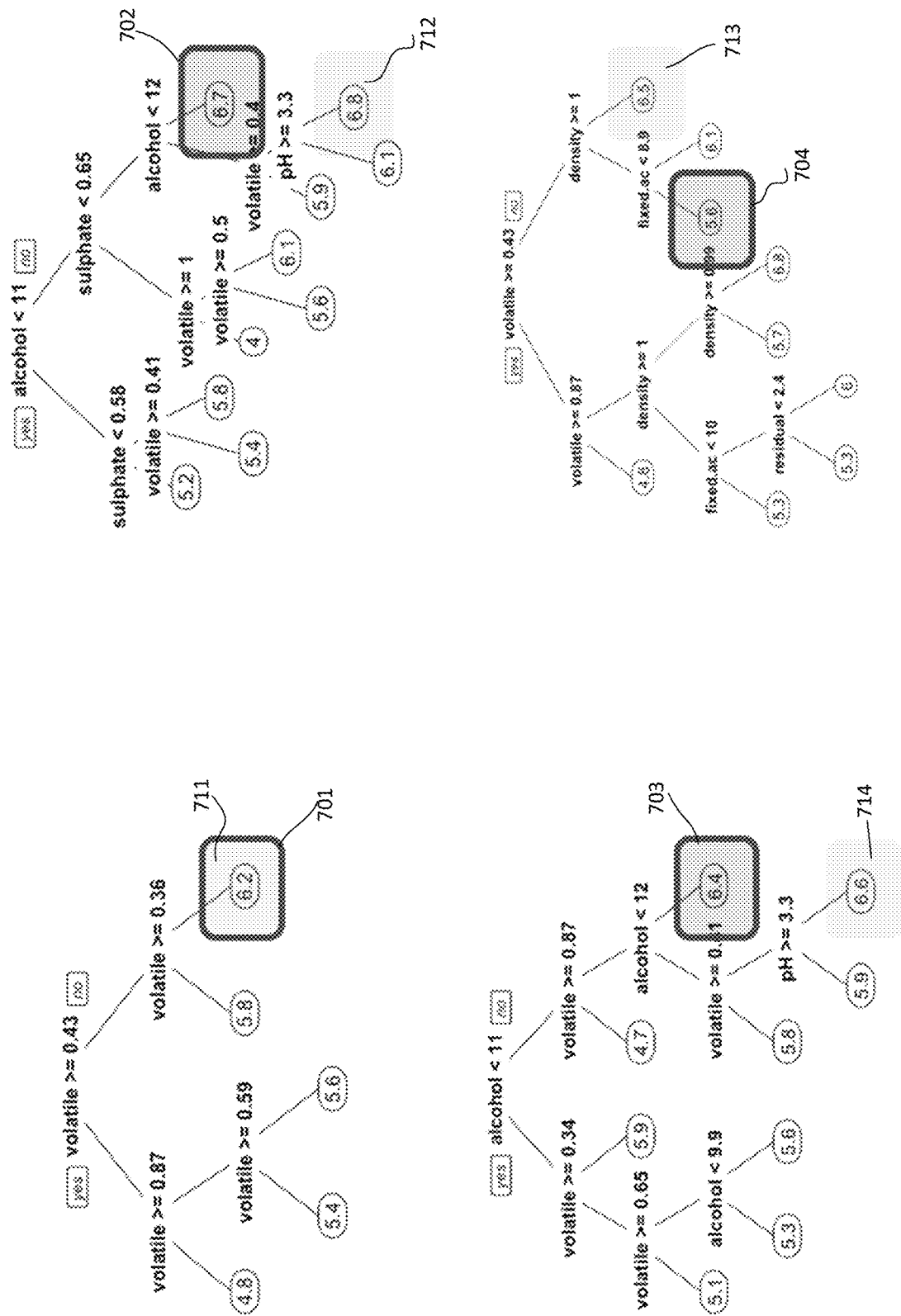
FIG. 7 illustrates an example of the result of the functionality of FIG. 2 for a four tree ensemble in accordance to embodiments of the invention.

FIG. 7 illustrates an example of the result of the functionality of FIG. 2 for a four tree ensemble in accordance to embodiments of the invention. The example of FIG. 7 utilized a wine dataset that was created from wine sampled from northern Portugal with the goal of predicting the wine quality based on physiochemical tests. The data set included 12 features and 4,898 data points. The target variable (i.e., the prediction generated by the tree ensemble) is an integer between 3 and 8 that predicts the wine quality. A partial feature list includes Alcohol Percentage, Sulphates Level, Volatile Acidity and pH.

FIG. 7 illustrates an example of optimization on a forest of 4 trees. The example of FIG. 7 is a simplified sample, as there typically would be 200-500 trees. Boxes 701-704 highlight the solution found by the optimization. It can be seen that the solution found by the optimization in accordance to embodiments is close to true optimality, shown in highlighted portions 711-714. At scale (e.g., 200-500 trees) it would be almost impossible to figure out what values of the features would lead to an optimal solution. In contrast, embodiments generate a close to optimal solution as demonstrated by the found solution on the 4 trees of FIG. 7.

As a result of the functionality of FIG. 2, the bounds generated include the following:

Volatile Acidity≤0.363
11.55≤Alcohol
0.645≤Sulphates
0.995≤Density
Fixed Acidity≤8.85

Therefore, according to the 4 trees of FIG. 7, the other 7 features do not matter for the quality of wine. Embodiments only generate bounds on features used in the predictive model. Any point within these bounds, according to the model, will have a high wine quality so a wine supplier/provider can make choices appropriately. A similar analysis is performed for retail when item sales are predicted so bounds are generated only for features that assist in predict the demand/sales of an item.

As disclosed, in embodiments, the demand model generated using the above functionality (i.e., FIGS. 2 and 5) is used to determine optimized pricing of a retail item, or optimized inventory level of a retail item, and can also be used for other applications having a need for a non-parametric ML model.

Price Optimization

Figure 8:
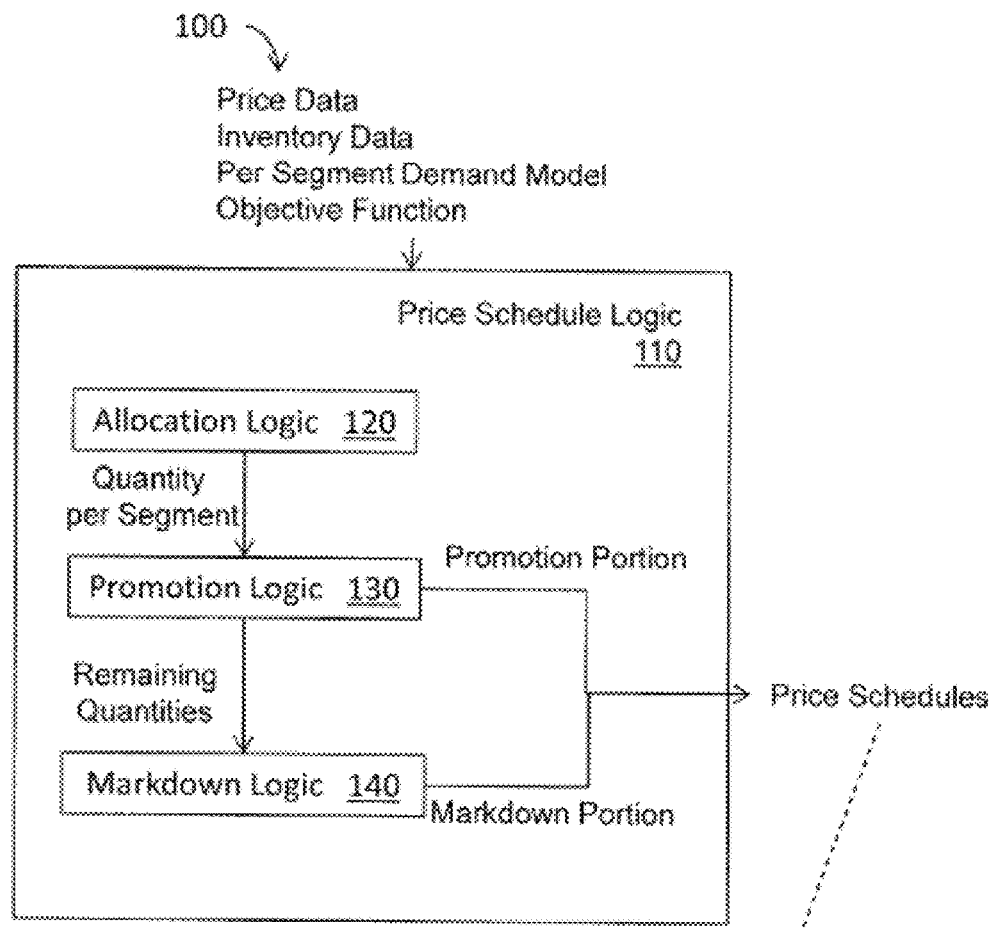
FIG. 8 illustrates a computerized system that generates a price schedule for a set of items in accordance with one embodiment.

In an embodiment, the optimized tree ensemble demand model generated by demand model generation 16 is implemented in a price optimization system. FIG. 8 illustrates an example price optimization system that uses the optimized tree ensemble demand model in accordance to embodiments. FIG. 8 illustrates a computerized system 100 that generates a price schedule for a set of items in accordance with one embodiment. The price schedule is, for example, a data structure stored in memory that contains data values and/or records for information as described herein. System 100 includes price schedule logic 110 that controls a processor to perform various operations disclosed below. In one embodiment, price schedule logic 110 is implemented as computer instructions embodied in a module stored in a non-transitory computer storage medium where the instructions are configured as an executable algorithm configured to perform the functions as described herein when executed by at least the processor of a computing device.

Price schedule logic 110 interacts by way of electronic communication over network or internet connection with a computing device of a retailer. The term "retailer" or "requesting device" is intended to include a computing device under the control of a retailer who prices items for sale and who is requesting, from system 100, a price schedule for items sold by the retailer. Price schedule logic 110 is configured to receive electronic communications from the remote computing device of the retailer that communicates price data for items, inventory data for the items, a per-segment demand model for the items, and a selected objective function.

The price data defines a set of prices that are to be considered for each item. The set of prices includes the regular price, promotion prices, and markdown prices for the item. In one embodiment, the promotion prices and the markdown prices are separated into two sets, neither of which includes the regular price for the item, to simplify the calculations in the promotion and markdown seasons. Sometimes the set of prices is referred to as the "price ladder" for an item. In one embodiment, cost data for each item is also input by price schedule logic 110 for use in calculating profits.

Inventory data includes an "inventory quantity" which, for the purposes of this description, includes the initial inventory quantity of an item that will be on hand at the beginning of the regular season and, optionally, scheduled shipments of the item to replenish the stock during the regular season. To input or receive price and inventory data for a set of items, price schedule logic 110 may query a database that stores such data (e.g., electronic records encoding price ladders and inventory and replenishment quantities).

The per-segment demand model may be provided by the retailer or otherwise accessible to price schedule logic 110 and is determined using demand model generation module 16. In one embodiment, the per segment demand model is non-parametric tree based ML model such as random forest or XGBoost. In one embodiment, the per-segment demand model is a stored set of instructions that, when executed by a processor, computes demand for an item based on the price of the item and other factors such as elasticity, promotion fatigue, seasonality, and so on. The per-segment demand model includes different demand parameter values for different customer segments. One example per-segment demand model will be described in detail below, however, it is to be understood that any demand model can be used in embodiments, including demand models that do not differentiate between different customer segments. In one embodiment, the retailer furnishes values for demand parameters based on their own sales histories and experience. In other embodiments, price schedule logic 110 stores and maintains the per-segment demand model or obtains the per-segment demand model and parameter values from a different source.

The objective function defines the sales-related quantity that the retailer seeks to maximize, and can be considered the target variable of the demand model. Example objective functions include profit and revenue.

Price logic 110 is configured to generate a price schedule that includes a promotion portion and a markdown portion. The price schedule assigns to the item a series of prices selected from the set of prices for respective time periods (e.g., weeks or days) during a regular season and also a clearance season for the item. A price schedule for an item is generated for each customer segment. Example price schedules for a "singles" customer segment and a "moms" customer segment are shown in FIG. 8. It can be seen that the price schedule is different for the two customer segments during the "regular/promotion" portion of the price schedule, while the price schedule is the same for the two customer segments during the "clearance/markdown" portion of the price schedule. Price schedule logic 110 is configured to transmit, by way of a network connection, the price schedules to the retailer for use in pricing the item.

The promotion and markdown schedule problem increases proportionally when customer segments are taken into account. One of the challenges to performing per-segment promotion and markdown scheduling is that the different customer segments share the same inventory. Another challenge is that the markdown policies are typically the same across all customer segments while per-segment promotion pricing can be achieved by targeted marketing. Price schedule logic 110 includes allocation logic 120, promotion logic 130, and markdown logic 140 that together cooperate to address these challenges using a multi-phase process to generate the promotion and markdown portions of the price schedule.

Allocation logic 120 is configured to allocate the inventory quantity (e.g., initial inventory and, optionally, replenishment quantities) among a plurality of customer segments based at least on a predicted contribution of each customer segment to the objective function. By allocating the inventory to each customer segment prior to performing the promotion price determination for each customer segment, the link between the customer segments is broken, greatly simplifying the process of generating the promotion portion and the markdown portion of the price schedule.

For example, a purse may be sold to three different customer segments: single women, mothers, and retirees. The per-segment demand model specifies the particular behaviors of these different types of customers by including different demand parameter values for each segment. Allocation logic 120 is configured to predict a contribution each customer segment to the objective function. In one embodiment, based on the per-segment demand model, allocation logic 120 may determine that: (1) when all the inventory quantity is allocated to the single women segment, $1200.00 in revenue (i.e., objective function) will be generated; (2) when all of the inventory quantity is allocated to mothers, $1000.00 in revenue will be generated; and (3) when all of the inventory quantity is allocated to retirees, $300.00 in revenue will be generated. Allocation logic 120 allocates the inventory quantity to the different customer segments based on this predicted contribution (e.g., 1200/(1200+1000+300) or 48% of the inventory quantity is allocated to the single women customer segment, and so on). In other embodiments, other methods of predicting the contribution of each customer segment to the objective function are used.

Promotion logic 130 is configured to determine the promotion portion of the price schedule. For each customer segment, based the quantity of inventory allocated to the customer segment, promotion logic 130 is configured to determine the promotion portion of the price schedule that maximizes the objective function. The promotion portion assigns to the item a series of prices selected from the set of prices for respective time periods during the regular season for the item.

Markdown logic 140 is configured to aggregate a quantity of remaining inventory in each customer segment at the end of the regular season. Markdown logic 140 is configured to, based at least on the aggregated inventory, determine a markdown portion of the price schedule for the item that maximizes the objective function. The markdown portion assigns a series of prices selected from the set of prices to the item for respective time periods during the clearance season for the item. Price logic 110 combines the promotion portion and the markdown portion for each customer segment to create the price schedule for the customer segment.

In one embodiment, system 100 is a computing/data processing system including an application or collection of distributed applications for enterprise organizations and can be implemented by system 10 of FIG. 1. The applications and computing system 100 may be configured to operate with or be implemented as a cloud-based networking system, a "software as a service" ("SaaS") architecture, or other type of networked computing solution. In one embodiment, price schedule logic 110 is a centralized server-side application that provides at least the functions disclosed herein and that is accessed by many users via computing devices/terminals communicating with the computing system 100 (functioning as the server) over a computer network. Additional details of system 100 are disclosed in U.S. patent application Ser. No. 16/380,185, the details of which are hereby incorporated by reference.

Inventory Optimization

In an embodiment, the optimized tree ensemble demand model generated by demand model generation 16 is implemented in an inventory management optimization system. Any known inventory optimization systems that uses a demand model can be used by implementing the optimized tree ensemble demand model in accordance to embodiments. In general, inventory optimization involves two questions for each product in the assortment: when to place an order and how much to order. The most widely used model of inventory management is the s/S policy. In such a model, the inventory is reviewed periodically and when the inventory position falls below 's', an order is placed to bring the inventory level up to 'S'. For larger values of s and S, the risk of stock-out and expected lost revenue is low, but the inventory holding cost is large. On the other hand, smaller values of s and S will result in less inventory cost at the expense of higher expected lost revenue. Given this trade-off, the goal is to determine the optimal s/S policy for each stock-keeping unit ("SKU")-Store to achieve the optimal balance between lost revenue and inventory cost while taking into account space capacity, the min/max order quantity, and lead time variability.

In known practices, the optimal policy for each SKU-Store is determined through a generally brute-force search by performing large scale simulations on numerous combinations of s/S to numerically evaluate the cost-revenue trade-off. For a mid-size grocery chain, the number of SKU-Stores can run into 300,000 which would require running simulations for millions of SKU-Store-policies and it would be close to impossible to run this on weekly basis.

To overcome the above challenges, embodiments develop the optimized tree ensemble ML model disclosed above in conjunction with FIGS. 1-7 to predict the lost revenue and inventory cost associated with different s/S policies based on variables such as demand distribution, lead time, pack size and space capacity. To that end, embodiments construct a training dataset by running simulation for a subset of SKU-Store-policies for different demand distributions and different ranges of s/S. The output of these simulations will serve as labeled data that can be used for training supervised models such as random forest.

Next, embodiments formulate the inventory optimization problem as a mixed integer program using the generated optimized tree ensemble ML model to minimize the objective. The typical objective is to minimize a weighted combination of total cost of inventory including holding cost and fixed ordering and the lost revenue. The constraints are driven by space capacity and contractual agreements with different suppliers as well as minimum required in stock inventory. Similar to the promotion and markdown pricing problem, embodiments can leverage the upper bound optimization formulation and investigate the performance in terms of accuracy and speed. This optimization problem with the ML model will replace the large-scale simulations, so it will be a huge improvement in terms of cutting computation time and hardware cost and while being more robust to incorporate different constraints.

Figure 9:
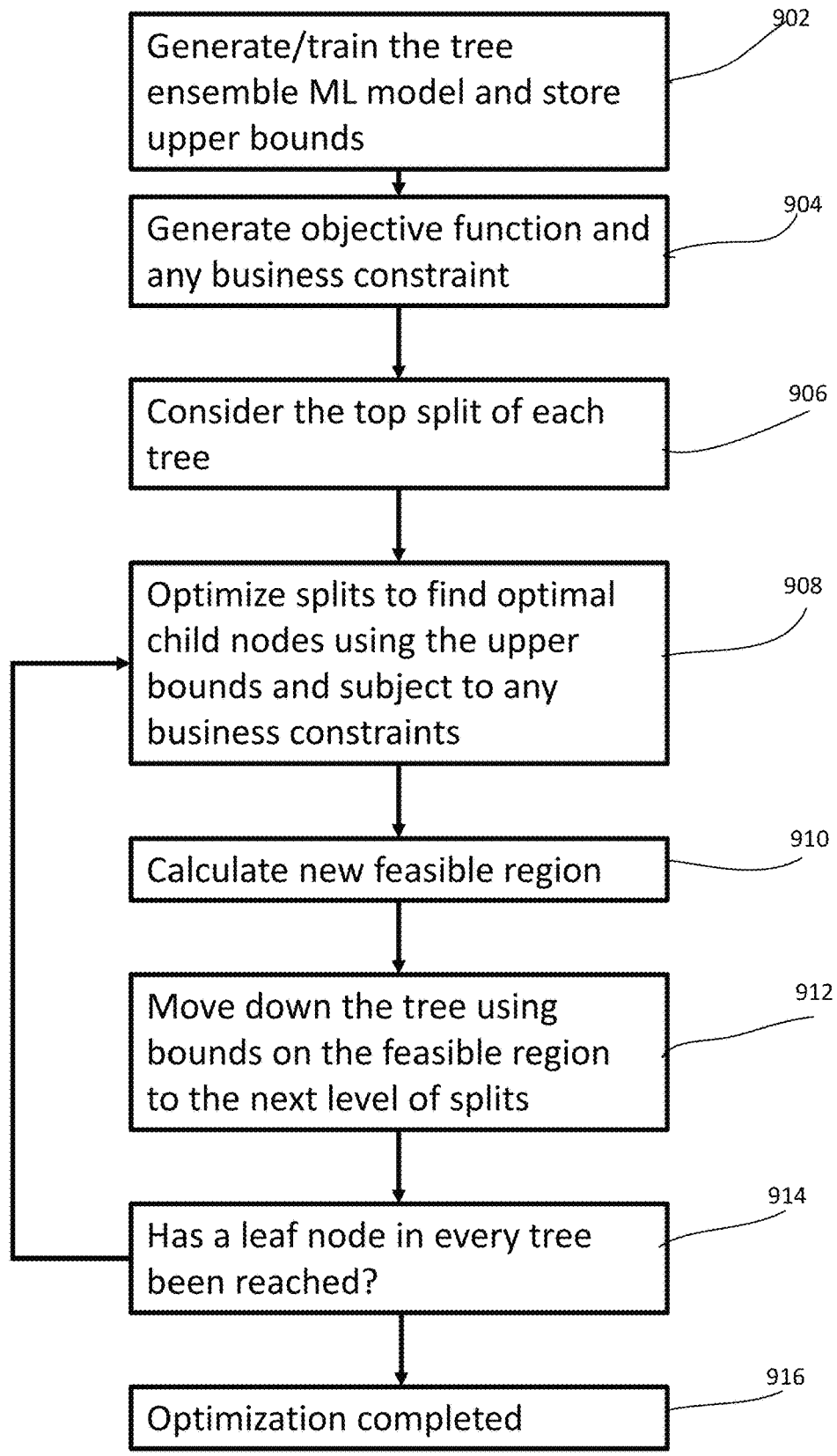
FIG. 9 is a flow diagram of the functionality of the demand model generation of FIG. 1 when generating a demand model for a retail item using a trained optimized tree ensemble in accordance with one embodiment.

FIG. 9 is a flow diagram of the functionality of demand model generation 16 of FIG. 1 when generating a demand model for a retail item using a trained optimized tree ensemble in accordance with one embodiment. As with the functionality of FIGS. 3 and 5 above, the functionality of FIG. 9 generates a demand prediction model and optimizes (for example the price or the inventory as described above) over that model.

At 902, embodiments generate/train the tree ensemble ML model (comprise of a plurality of trees, such as 200-500 trees) and store upper bounds for the trees. The training can include the use of a training set of data and a validation set of data, and the data can be historical sales data for the retail item, including all relevant features.

At 904, embodiments generate an objective function, such as maximizing price or revenue, and any business constraints relevant to the retail item.

At 906, the top split of each tree is considered.

At 908, the splits are optimized to find optimal child nodes using the upper bounds and subject to any of the business constraints.

At 910, a new feasible region is calculated.

At 912, embodiments move down the tree using bounds on the feasible region to the next level of splits.

At 914, it is determined if a leaf node in every tree has been reached. If yes, the optimization is completed at 916. Otherwise, functionality continues at 908.

The optimized demand model completed at 916 is then used in certain embodiments to determine optimized pricing or optimized inventory levels as described above.

Figure 10:
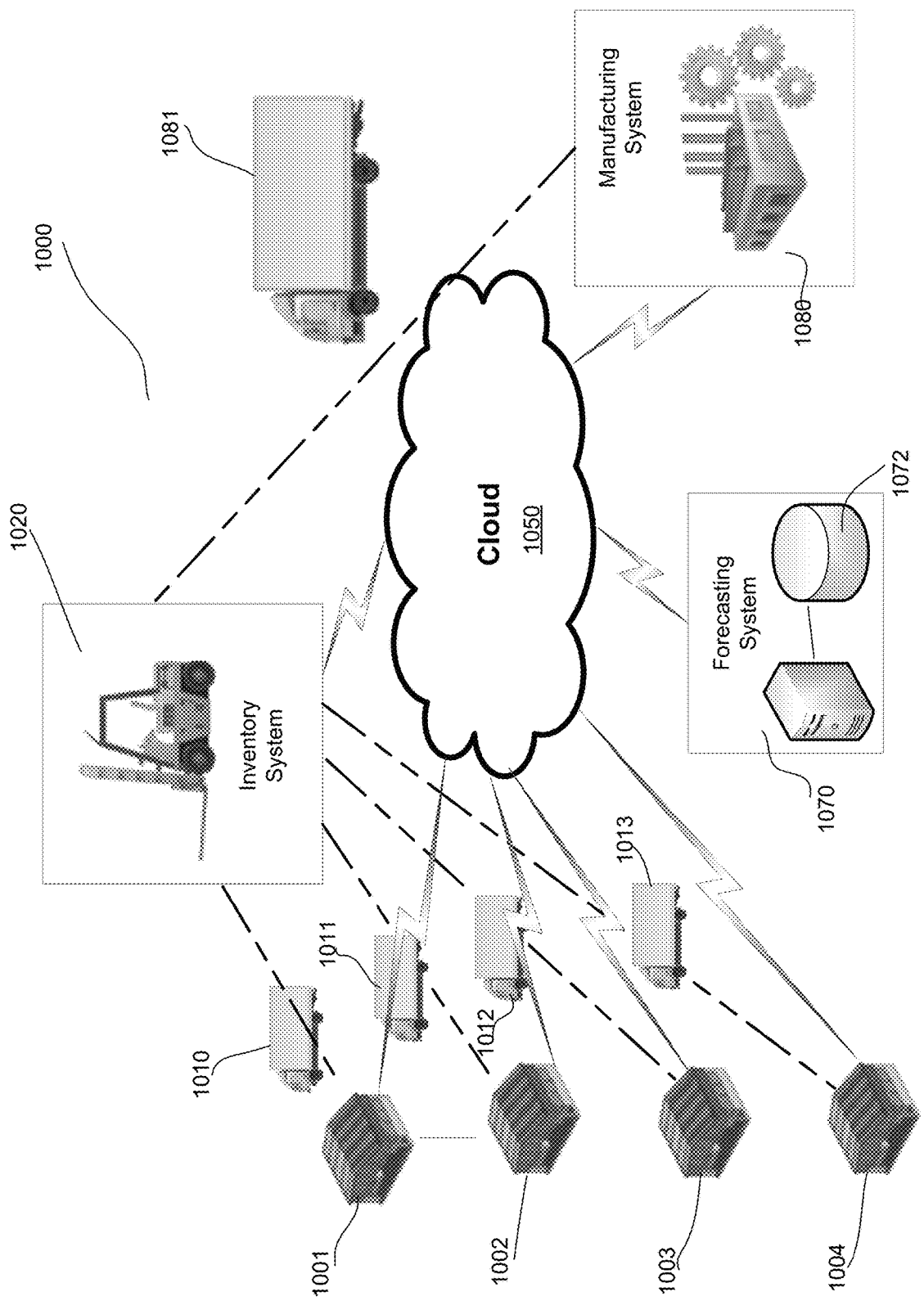
FIG. 10 illustrates an integrated manufacturing, inventory and logistics system that includes demand forecasting using the optimized demand model as disclosed herein in accordance with one embodiment.

FIG. 10 illustrates an integrated manufacturing, inventory and logistics system 1000 that includes demand forecasting using the optimized demand model as disclosed herein in accordance with one embodiment. Embodiments can use the optimized demand model to fully automate the processes. For example, as the results of using the optimized demand model, and determining optimized pricing or optimized inventory levels, system 10 of FIG. 1 can generate an electronic order from an inventory management system for a determined final inventory allocation, the electronic order causing a reallocated amount of the retail item to be sent, using a transportation mechanism, from one or more warehouses to one or more retail stores as well as fulfilling the generated electronic order at one or more of the plurality of warehouses.

As shown in FIG. 10, system 1000 can include a product demand forecasting system 1070 that forecasts future product demand and in some instances forecasts and/or considers future demand for hundreds of thousands of products, or in some applications tens of millions or more products at one or more retail stores 1001-1004. Forecasting system 1070 is in communication through a cloud network 1050 or other type of communications network with one or more inventory systems 1020 and one or more manufacturing systems 1080.

Forecasting system 1070 generates demand forecasting by implementing the functionality disclosed in conjunction with FIG. 1-7 above by generating an optimized demand model. Inventory system 1020 stores inventory and provides transportation logistics to deliver items to stores 1001-1004 using trucks 1010-1013 or some other transportation mechanisms. Inventory system 1020 in one embodiment implements an Enterprise Resource Planning ("ERP") specialized computer system or a specialized inventory control system that uses input from demand forecasting system 1070 to determine levels of inventories and the amount and timing of the delivery of items to stores 1001-1004. The functionality of FIG. 10 can be completely automated in some embodiments using automated loading mechanisms and self-driving transportation and the specialized data structures.

Manufacturing system 1080 manufactures items to be sent to inventory system 1020 and provides transportation logistics to deliver the items to inventory system 1020 using a truck 1081 or some other transportation mechanisms. Manufacturing system 1080 in one embodiment implements an ERP specialized computer system or a specialized manufacturing system that uses input from forecasting system 1070 to determine an amount of items to manufacture, inventory of resources that are used for the manufacturing, and the amount and timing of the delivery of items to inventory system 1020.

Forecasting system 1070 can utilize information from inventory system 1020, a sales tracking system (not shown) and/or databases in forecasting demand for products. In forecasting demand, forecasting system 1070 attempts to predict uncharacteristic demand of one or more products that results from events, weather, social demand, economic factors and other factors. Tens, to hundreds to thousands of different variables may be tracked that can have an effect on the demand of one or more products. Changes in these variables can result in uncharacteristic demands. For example, changes in forecasted weather can be tracked, and one or more variables associated with the forecasted weather can be used in determining whether such a change is weather may have an effect on demand, and may further forecast a change in demand.

In general, the elements of FIG. 10 perform sales, manufacturing, or consumption of inventory. Retail locations/stores 1001-1004 for direct consumer sales exhibit the most volatile inventory patterns, due to the random nature and external factors affecting sales. However, manufacturing facilities and sites that consume inventory (such as product integrators, internet shippers, etc. products used in the local facility) also benefit from demand forecasting as disclosed herein. As disclosed, each retail location 1001-1004 sends sales data and historic forecast data to forecasting system 1070. The sales data includes inventory depletion statistics for each item, or SKU/UPC for each sales period, typically days, in the previous sales cycles (i.e. weeks), typically 4-7 weeks of inventory cycles.

Forecasting system 1070 stores the sales data in a repository 1072, and employs the sales data for generating orders to replenish inventory. The orders include a set of items and a quantity for each item for maintaining the inventory level at a store 1001-1004.

Many retail ordering schemes rely on days of the week for sales periods and sales cycles. In one configuration, in an inventory management environment having inventory statistics, in which the inventory statistics are specific to each day of the week, inventory system 1020 determines target inventory levels by gathering, for each day of the week, inventory level statistics from previous sales. Embodiments compute, based on the inventory level statistics, an inventory level for each day of the week, such that the safety stock accommodates variations in inventory between the different days of the week. Embodiments render, for each of a plurality of items, a stocking level indicative of the target inventory level including the safety stock for each day of the week. Embodiments compute an ordering quantity based on a lead time such that the ordered quantity arrives to satisfy the rendered stocking level on the determined day of the week. Identifying the actual stock levels includes identifying stock levels on the day of the week from previous weeks from the history data, thus focusing on the same day of the week over time, rather than an average of all days in the week.

In particular configurations, the disclosed embodiments may be employed in conjunction with specialized and/or particularly high volume retail sales environments. In large logistics and distribution operations, it is beneficial to load trucks as full as possible, and in the event deferral of items to a successive trip is needed, to select those items which will have a least likely chance of interrupting sales activity. Accordingly, embodiments are operable in conjunction with POS system 99 to identify high velocity or high turnover items that tend to be sold and replenished faster than other items. A UPC bar code symbol or radio-frequency identification ("RFID") on an item includes a field, designation or value, that alone or in conjunction with a database lookup, designates an item as a high velocity item appropriate for safety stock treatment as defined herein.

A high velocity item may be accommodated by identifying, for each of a plurality of items represented in an inventory database, a field for a product identifier and a field denoting a safety stock for the item, and determining, for each of the product identifiers, a product segmentation field based on product velocity indicative of increased product replenishment demands resulting from a sales volume. The disclosed embodiments determine based on the velocity field, whether to compute a safety stock, i.e. whether the overhead and burden to resupply according to the safety stock is worthwhile given the product throughput.

In other embodiments, supply logistics may invoke a delivery frequency higher than one truck a day, hence triggering a resupply window with a higher granularity. In such a case, the safety stock may be more specific than an individual day, such as a Monday AM and Monday PM, or to designate multiple delivery or time windows within a particular day of the week, such as 7:00 AM, 11:00 AM and 4:00 PM.

Embodiments, including the generated demand forecast, may be employed in implementing supply logistics and designating deliveries (i.e., trucks) and manifest (i.e., contained items) in accordance with demand and profit margins of the transported items. High velocity items might be deemed to have priority space on a particular delivery, but could further be selected based on a profit margin or markup on the included items, and items with the greatest revenue generation potential selected for inclusion.

In such a product inventory shipping environment that uses the demand forecast disclosed herein and has a plurality of transport vehicles, each vehicle (e.g., truck) is configured for receiving a fixed payload of items for delivery to a sales location for inventory replenishment. Embodiments can provide guidance in loading a delivery vehicle, by, for each item of a plurality of items including a first item and a second item, computing a safety stock and determining, based on the computed safety stock of the first item and the second item, a quantity of each of the first item and the second item to be loaded into the delivery vehicle. Embodiments recompute a truck loading quantity based on the safety stock if insufficient space is available in the delivery vehicle for the determined quantity of the first item and the second item, meaning that certain items would need to be omitted and deferred to a successive delivery.

As disclosed, the upper bound optimization finds the best range of values (i.e., region) for the set of variables that would maximize/minimize either the ensemble trees' prediction, or a function based on the prediction. In the ensemble tree learning method, the prediction from multiple decision trees are combined to obtain better predictive performance than could be obtained from any of the individual trees alone. Within each tree, the branches represent different decision paths and each leaf node represents an outcome. Embodiments leverage the building process of the trees to store information about what the best payoff could be on either side of a tree split, hence the upper bound optimization. This information is created and stored based on the data of the split, without having to explore the entire depth of the tree and is used to quickly optimize in an iterative 3-step algorithm.

Embodiments, in general, move down the levels of the tree in an iterative way. At each level, it optimizes to select the best child node in terms of upper bound and recalculates the bounds on each feature accordingly.

Embodiments can be scalable by storing and retrieving the information in an efficient manner. This is achieved by converting the trees to a dataframe, storing information for each node about what is the upper bound of either side of split, and leveraging data structures such as hash tables for storing the information. It then executes a series of optimization.

The upper bound optimization in accordance to embodiments can handle non-parametric predictive models such as tree ensemble in a subsequent optimization problem that minimizes or maximizes a function based on the prediction. Such non-parametric machine learning models can often improve the prediction accuracy which in turn results in more robust pricing and inventory decisions generated by the optimization formulation. Embodiments scale well and can handle a high number of features or trees and a large size of data. This is important because the size of optimization problems in retail is proportionate to the number of SKU/Stores, which can run into hundreds of thousands for a mid-size retailer.

Embodiments can easily incorporate business constraints and is tractable. Unlike other solutions that try to tackle similar problems, embodiments do not require the problem to be unconstrained or only have constraints that are based on a single feature. For example in the pricing optimization problem there are various temporal and cross-product constraints related to promotions and markdowns. Similarly in inventory optimization problem there can be thousands of constraints based on contractual agreements with suppliers, space capacity and lead time.

Embodiments can be applicable not just in the context of retail predictive and optimization problems but can be applied to any class of optimization problems that exhibit similar structural properties. Embodiments seamlessly integrate tree ensemble ML models with complex and large scale optimization problem. Advantages of embodiments include: using the optimization method, one can use the predictions that are produced by machine learning models in a subsequent optimization problem; embodiments can easily incorporate business constraints; embodiments scale well and is suitable for solving real-size large scale problems; and embodiments can be applied to a broad class of optimization problems.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method implemented by one or more processors for generating and training an optimized demand model for a retail item, the method comprising:
    training a tree ensemble machine learning model comprising a plurality of trees by:
        receiving the plurality of trees, each of the plurality of trees comprising one or more levels of splits and a plurality of nodes, each of the plurality of nodes corresponding to a demand feature that influences demand for the retail item;
        storing an upper bound for each of the plurality of trees;
        generating an objective function for the optimized demand model;
        for each top split of each of the plurality of trees, determining optimal child nodes using a respective upper bound;
        calculating a new feasible region for each of the plurality of trees;
        using bounds on the new feasible region, moving down each of the plurality of trees to a next level of splits; and
        repeating determining the optimal child nodes, calculating the new feasible region, and using the bounds until a leaf node of each of the plurality of trees has been reached; and
    generating the optimized demand model when the leaf node of each of the plurality of trees has been reached using the upper bound for each of the plurality of trees, the optimized demand model generated based on a target variable prediction of the optimized demand model.

2. The method of claim 1, each upper bound comprising information on a best expected payoff on either side of the top split for each of the plurality of trees, the method further comprising:
    for the top split of each of the plurality of trees, selecting a demand feature that a greatest number of trees split on;
    optimizing the selected demand feature using the upper bound for each of the plurality of trees;
    storing the optimized selected demand feature; and
    repeating selecting the demand feature, optimizing the selected demand feature and storing the optimized selected demand feature until all leaf nodes of the plurality of trees have been considered.

3. The method of claim 1, further comprising:
    when the leaf node of each of the plurality of trees has not been reached, optimizing the next level of splits.

4. The method of claim 1, further comprising generating an optimized markdown pricing for the retail item based on the optimized demand model, wherein training the optimized demand model comprises receiving historical sales data for the retail item, each of the plurality of trees being trained on a subset of the historical sales data.

5. The method of claim 1, further comprising:
    generating an optimized inventory level for the retail item at each of a plurality of retail stores based on the optimized demand model.

6. The method of claim 5, further comprising:
    based on the optimized inventory level, generating an electronic order from an inventory management system, the electronic order causing an amount of the retail item to be sent, using a transportation mechanism, from a first warehouse of a plurality of warehouses to a first retail store of the plurality of retail stores, and causing an additional amount of the retail item to be sent to the first retail store in comparison to using a non-optimized inventory level; and
    fulfilling the electronic order at one or more of the plurality of warehouses.

7. The method of claim 1, wherein the optimized demand model comprises parallel splits, the training comprising using a box method.

8. The method of claim 1, wherein the optimized demand model comprises hyperplane splits, the training comprising using a hyperplane method.

9. A non-transitory computer-readable medium having instructions stored thereon, when executed by one or more processors, cause the processors to generate and train an optimized demand model for a retail item, the generating and training comprising:
    training a tree ensemble machine learning model comprising a plurality of trees by:
        receiving the plurality of trees, each of the plurality of trees comprising one or more levels of splits and a plurality of nodes, each of the plurality of nodes corresponding to a demand feature that influences demand for the retail item;
        storing an upper bound for each of the plurality of trees;
        generating an objective function for the optimized demand model;
        for each top split of each of the plurality of trees, determining optimal child nodes using a respective upper bound;
        calculating a new feasible region for each of the plurality of trees;
        using bounds on the new feasible region, moving down each of the plurality of trees to a next level of splits; and
        repeating determining the optimal child nodes, calculating the new feasible region, and using the bounds until a leaf node of each of the plurality of trees has been reached; and
    generating the optimized demand model when the leaf node of each of the plurality of trees has been reached using the upper bound for each of the plurality of trees, the optimized demand model generated based on a target variable prediction of the optimized demand model.

10. The computer-readable medium of claim 9, each upper bound comprising information on a best expected payoff on either side of the top split for each of the plurality of trees, the generating and training further comprising:
for the top split of each of the plurality of trees, selecting a demand feature that a greatest number of trees split on;
optimizing the selected demand feature using the upper bound for each of the plurality of trees;
storing the optimized selected demand feature; and
repeating selecting the demand feature, optimizing the selected demand feature and storing the optimized selected demand feature until all leaf nodes of the plurality of trees have been considered.

11. The computer-readable medium of claim 9, the generating and training further comprising:
when the leaf node of each of the plurality of trees has not been reached, optimizing the next level of splits.

12. The computer-readable medium of claim 9, the generating and training further comprising generating an optimized markdown pricing for the retail item based on the optimized demand model, wherein training the optimized demand model comprises receiving historical sales data for the retail item, each of the plurality of trees being trained on a subset of the historical sales data.

13. The computer-readable medium of claim 9, the generating and training further comprising:
generating an optimized inventory level for the retail item at each of a plurality of retail stores based on the optimized demand model.

14. The computer-readable medium of claim 13, the generating and training further comprising:
based on the optimized inventory level, generating an electronic order from an inventory management system, the electronic order causing an amount of the retail item to be sent, using a transportation mechanism, from a first warehouse of a plurality of warehouses to a first retail store of the plurality of retail stores, and causing an additional amount of the retail item to be sent to the first retail store in comparison to using a non-optimized inventory level; and
fulfilling the electronic order at one or more of the plurality of warehouses.

15. The computer-readable medium of claim 9, wherein the optimized demand model comprises parallel splits, the training comprising using a box method.

16. The computer-readable medium of claim 9 wherein the optimized demand model comprises hyperplane splits, the training comprising using a hyperplane method.

17. A system for generating and training an optimized demand model for a retail item using historical sales data for the retail item, the system comprising one or more processors for:
training a tree ensemble machine learning model comprising a plurality of trees by:
receiving the plurality of trees, each of the plurality of trees comprising one or more levels of splits and a plurality of nodes, each of the plurality of nodes corresponding to a demand feature that influences demand for the retail item;
storing an upper bound for each of the plurality of trees;
generating an objective function for the optimized demand model;
for each top split of each of the plurality of trees, determining optimal child nodes using a respective upper bound;
calculating a new feasible region for each of the plurality of trees;
using bounds on the new feasible region, moving down each of the plurality of trees to a next level of splits; and
repeating determining the optimal child nodes, calculating the new feasible region, and using the bounds until a leaf node of each of the plurality of trees has been reached; and
generating the optimized demand model when the leaf node of each of the plurality of trees has been reached using the upper bound for each of the plurality of trees, the optimized demand model generated based on a target variable prediction of the optimized demand model.

18. The system of claim 17, each upper bound comprising information on a best expected payoff on either side of the top split for each of the plurality of trees, further comprising:
for the top split of each of the plurality of trees, selecting a demand feature that a greatest number of trees split on;
optimizing the selected demand feature using the upper bound for each of the plurality of trees;
storing the optimized selected demand feature; and
repeating selecting the demand feature, optimizing the selected demand feature and storing the optimized selected demand feature until all leaf nodes of the plurality of trees have been considered.

19. The system of claim 17, the processors further:
when the leaf node of each of the plurality of trees has not been reached, optimizing the next level of splits.

20. The system of claim 17, the processors further generating an optimized markdown pricing for the retail item based on the optimized demand model, wherein training the optimized demand model comprises receiving historical sales data for the retail item, each of the plurality of trees being trained on a subset of the historical sales data.

* * * * *

UNITED STATES PATENT AND TRADEMARK OFFICE
CERTIFICATE OF CORRECTION

| | | |
|---|---|---|
| PATENT NO. | : 12,020,196 B2 | Page 1 of 1 |
| APPLICATION NO. | : 17/449112 | |
| DATED | : June 25, 2024 | |
| INVENTOR(S) | : Thayaparan et al. | |

It is certified that error appears in the above-identified patent and that said Letters Patent is hereby corrected as shown below:

In the Specification

In Column 3, Line 49, delete "Where" and insert -- where --, therefor.

In Column 7, Line 42, delete "Lagrangean" and insert -- Lagrangian --, therefor.

In Column 8, Line 30, delete "$q_{i,L_i}^{t}, q_{i,R_i}^{t}$" and insert -- $q_{i,L_i}^{t}, q_{i,R_i}^{t}$ --, therefor.

In Column 13, Line 61, delete "FIG." and insert -- FIGS. --, therefor.

In the Claims

In Column 18, Line 36, in Claim 9, delete "fora" and insert -- for a --, therefor.

Signed and Sealed this
Tenth Day of December, 2024

Katherine Kelly Vidal
*Director of the United States Patent and Trademark Office*